(12) United States Patent
Beaudoin (10) Patent No.: US 7,855,978 B2
(45) Date of Patent: *Dec. 21, 2010

(54) METHOD OF DISPLAYING NODES AND LINKS

(75) Inventor: Luc Beaudoin, Gatineau (CA)

(73) Assignee: Nortel Networks Limited, Mississauga, Ontario (CA)

( * ) Notice: Subject to any disclaimer, the term of this patent is extended or adjusted under 35 U.S.C. 154(b) by 1401 days.

This patent is subject to a terminal disclaimer.

(21) Appl. No.: 11/024,910

(22) Filed: Dec. 30, 2004

(65) Prior Publication Data

US 2005/0114795 A1    May 26, 2005

Related U.S. Application Data

(63) Continuation of application No. 09/628,332, filed on Jul. 28, 2000, now Pat. No. 6,854,091.

(51) Int. Cl.
G01R 31/08 (2006.01)

(52) U.S. Cl. .................. 370/254; 370/241; 370/331; 370/442; 709/223; 709/224; 345/340; 345/853

(58) Field of Classification Search .......... 370/241, 370/254, 331, 442; 709/223, 224; 345/853, 345/854, 855, 733, 734, 735, 736
See application file for complete search history.

(56) References Cited

U.S. PATENT DOCUMENTS

| | | | |
|---|---|---|---|
| 5,278,951 A * | 1/1994 | Camacho et al. ............ 345/440 |
| 5,295,243 A | 3/1994 | Robertson et al. |
| 5,295,244 A * | 3/1994 | Dev et al. .................... 715/853 |
| 5,333,254 A | 7/1994 | Robertson |
| 5,408,597 A | 4/1995 | Kita et al. |
| 5,414,809 A * | 5/1995 | Hogan et al. ................ 715/765 |
| 5,596,703 A * | 1/1997 | Eick et al. ................... 715/700 |
| 5,710,899 A * | 1/1998 | Eick .......................... 715/764 |
| 5,751,965 A * | 5/1998 | Mayo et al. ................. 709/224 |
| 5,809,282 A * | 9/1998 | Cooper et al. ............... 709/226 |
| 5,870,559 A * | 2/1999 | Leshem et al. ............. 709/224 |
| 5,900,878 A | 5/1999 | Goto et al. |
| 5,930,499 A * | 7/1999 | Chen et al. ..................... 716/8 |
| 5,953,724 A * | 9/1999 | Lowry ........................ 707/102 |
| 5,963,546 A * | 10/1999 | Shoji ......................... 370/255 |
| 5,977,972 A * | 11/1999 | Bates et al. ................. 715/786 |
| 6,073,110 A * | 6/2000 | Rhodes et al. ................. 705/8 |
| 6,111,578 A * | 8/2000 | Tesler ........................ 715/850 |
| 6,144,962 A * | 11/2000 | Weinberg et al. ............ 707/10 |
| 6,219,050 B1 * | 4/2001 | Schaffer ..................... 715/853 |
| 6,259,458 B1 * | 7/2001 | Theisen et al. ............. 345/440 |
| 6,260,072 B1 * | 7/2001 | Rodriguez-Moral ........ 709/241 |

(Continued)

*Primary Examiner*—Ayaz R Sheikh
*Assistant Examiner*—Andrew C Lee
(74) *Attorney, Agent, or Firm*—Mukundan Chakrapani; Borden Ladner Gervais LLP (57) ABSTRACT

The present invention relates to an improved method of displaying nodes, and links between nodes. Instead of the conventional method of displaying nodes and links as points and lines respectively, in accordance with the present invention, the nodes are each represented by parallel node lines. The links are then represented by link lines drawn perpendicular to the node lines, each of said link lines terminating at the node lines representing the nodes connected by the link represented by the link line. A graphical user interface incorporating this improved method of displaying nodes and links is also contemplated.

12 Claims, 11 Drawing Sheets

U.S. PATENT DOCUMENTS

| | | |
|---|---|---|
| 6,310,883 B1 * | 10/2001 | Mann et al. ................ 370/408 |
| 6,314,093 B1 * | 11/2001 | Mann et al. ................ 370/351 |
| 6,369,819 B1 * | 4/2002 | Pitkow et al. .............. 345/440 |
| 6,380,953 B1 * | 4/2002 | Mizuno ..................... 715/764 |
| 6,438,110 B1 * | 8/2002 | Rai et al. ................... 370/254 |
| 6,470,383 B1 * | 10/2002 | Leshem et al. ............. 709/223 |
| 6,486,899 B1 | 11/2002 | Bush |
| 6,499,034 B1 * | 12/2002 | Mackinlay ................. 707/102 |
| 6,522,329 B1 * | 2/2003 | Ihara et al. ................. 345/441 |
| 6,584,501 B1 * | 6/2003 | Cartsonis et al. ........... 709/224 |
| 6,608,635 B1 * | 8/2003 | Mumm ...................... 715/736 |
| 6,654,803 B1 * | 11/2003 | Rochford et al. ........... 709/224 |
| 6,968,341 B2 * | 11/2005 | Hand et al. ................. 707/102 |
| 7,124,369 B2 * | 10/2006 | Beaudoin .................... 715/738 |
| 7,202,868 B2 * | 4/2007 | Hao et al. ................... 345/440 |

* cited by examiner

METHOD OF DISPLAYING NODES AND LINKS

RELATED APPLICATIONS

This application is a continuation of U.S. application Ser. No. 09/628,332 filed on Jul. 28, 2000 now U.S. Pat. No. 6,854,091 entitled, "Method of Displaying Nodes and Links".

FIELD OF THE INVENTION

The invention relates to connected graphs, and in particular, to an improved method of displaying nodes, and links between nodes.

BACKGROUND OF THE INVENTION

A connected graph is any means of displaying a number of nodes (typically represented by points), and links (typically represented by lines between such points) connecting such nodes. Such connected graphs are used in mathematics to represent theoretical or real scenarios involving multiple nodes and the interconnections between them. In commercial applications, such graphs are used in industries such as the transportation industry to show transportation connections between cities, or subway stations for example, or in the telecommunications industry to display communication links between communication nodes.

Figure 1:
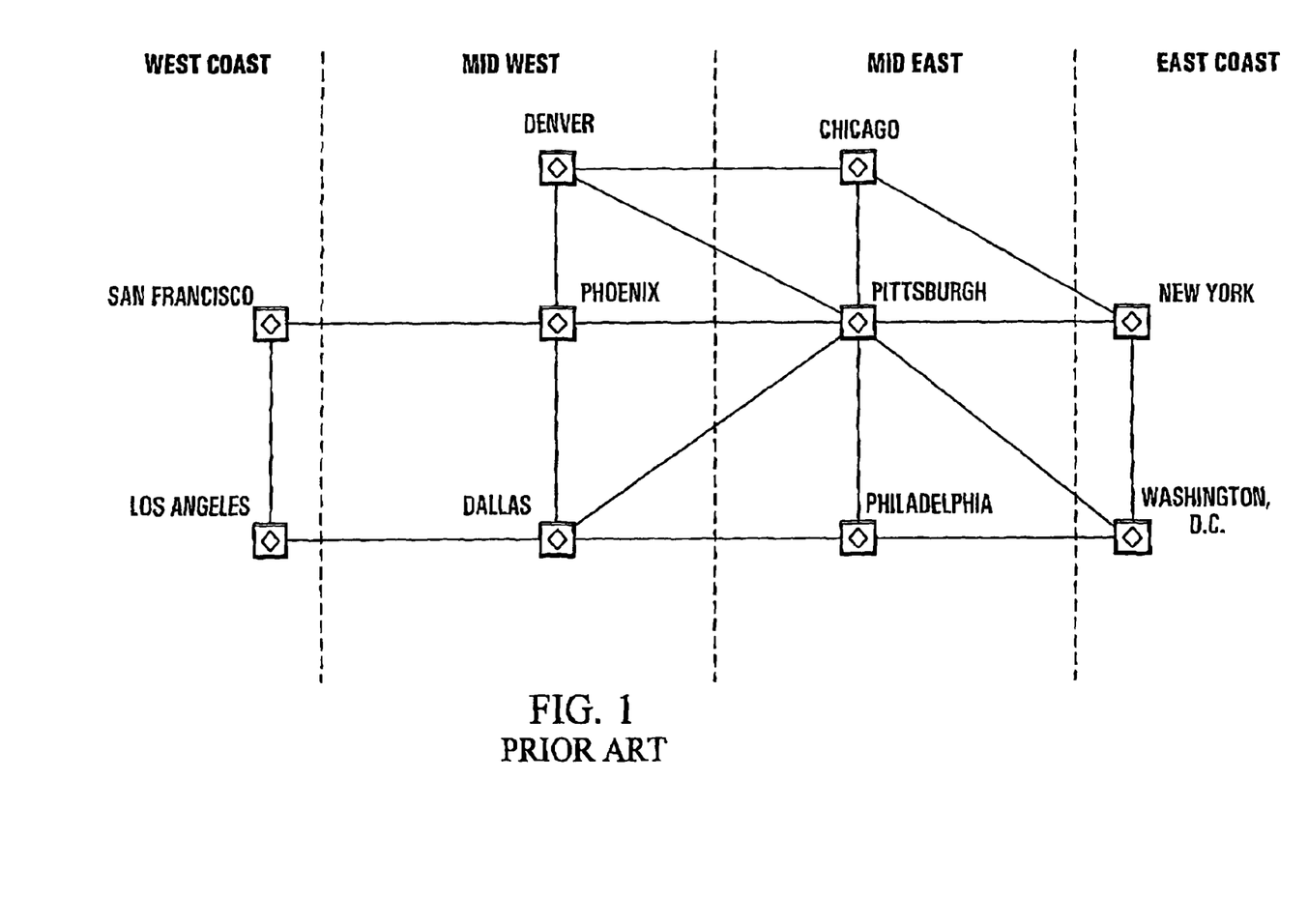
FIG. 1 is an example of a typical connected graph representing either transportation or telecommunication links between nodes throughout the United States, grouped by geographic region.
Figure 2:
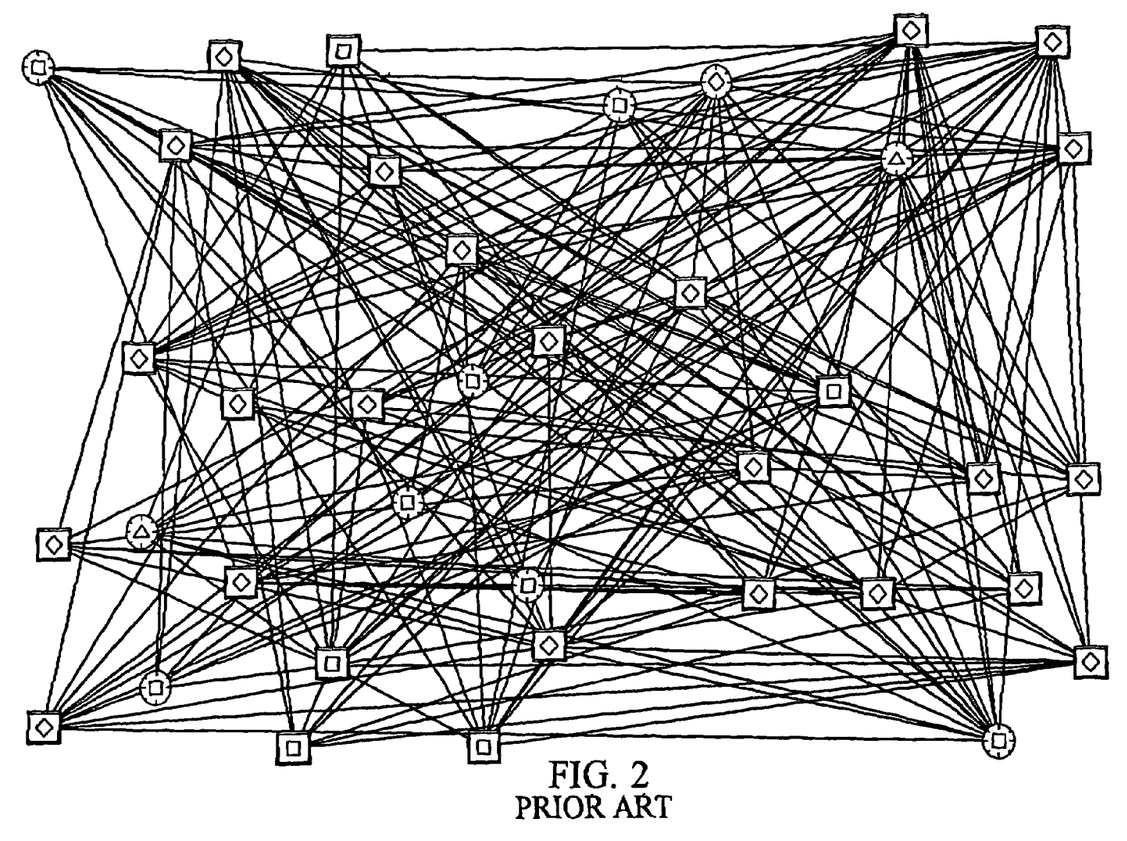
FIG. 2 is an example of a complex connected graph.

In typical connected graphs, the nodes are positioned geographically or logically, such that the position of such nodes provides some information to the viewer of the connected graph. An example of such a connected graph for either a transportation or telecommunication network is shown in FIG. 1. In this example, the nodes are displayed in a pseudo-geographical organization to communicate the relative location of each set of nodes. This method of displaying nodes and links is suitable where the number of nodes is relatively low, and the interconnections between the nodes are simple, such that there are only a few links connecting the nodes. However, where there are either a large number of nodes, a large number of interconnections between the nodes, or some combination thereof, such a connected graph can become extremely complex such that it becomes impossible for the viewer to extract any useful information from it. An example of such a complex connected graph is shown in FIG. 2. The representation of the links connecting the nodes become so dense that it forms a tight mesh, making it very difficult for the viewer to tell which links connect which nodes. This problem is very common in telecommunication applications where there can be dozens or even hundreds of highly interconnected nodes in a given network.

Several efforts have been made at solving the problem of complex connected graphs. Basic solutions include using different colours and/or line thicknesses for different links. In other efforts, the geographical or logical placement of the nodes is abandoned in favour of reducing the complexity of the connected graph. In such examples, the nodes may be arranged in a circle with links between the nodes forming arcs across the circle, Alternatively, the nodes and links may be represented in a three-dimensional fashion other solutions include methods of viewing portions of complex connected graphs with greater clarity. For example, a "visual fish eye" or virtual magnifying glass may be used to expand a portion of the graph for easier viewing. However, these efforts provide only partial solutions since again, as the number of nodes and the interconnections between them increases, the graphs become, increasingly complex such that extracting any information from them becomes extremely difficult.

A further problem adding to the complexity of such graphs is introduced by telecommunication applications in which there are often several communication links between any two nodes. For example, a single fiber-optic bundle connecting two nodes may contain hundreds of individual cables, each of which must be represented on the connected graph.

Additionally, it is often desirable in real-world applications of connected graphs to visually provide some information about the links. For example, it may be desirable to communicate the status of a communication link, or the frequency of flights for an air link. Such information may be provided by using different colours, or different link representations (dashed lines, for example). However, such information is lost when the connected graph becomes complex.

SUMMARY OF THE INVENTION

In a broad aspect, the present invention provides a method, optionally in a computer system, for displaying representations of nodes, and links connecting the nodes. In this method, a node line is displayed representing each one of the nodes, the node lines being parallel to one another. Further, a link line is displayed representing each one of the links, the link lines being perpendicular to the node lines. Each link line terminates at two node lines, these two node lines representing the nodes connected by the link represented by the link line.

In other aspects, the present invention contemplates the above method being used to display nodes and links in a telecommunication network, the link lines visually communicating link attributes of each link, the link lines being ordered or grouped according to a selected link attribute identifier, performance bars being displayed in association with each link line, and a time selector being displayed for selection of the time at which the link information is to be displayed.

The present invention also contemplates a graphical user interface adapted to implement the above method, a computer system adapted to implement the above method, and a computer readable medium having stored thereon instructions for instructing a computer to implement the above method.

The present invention also contemplates a printed medium having printed thereon a visual representation of nodes, and links connecting said nodes. This visual representation includes a node line representing each one of the nodes, each node line being parallel to every other node line, and a link line representing each one of the links, each link line being perpendicular to each node line. Each link line terminates at two node lines, these two node lines representing the nodes connected by the link represented by the link line.

Advantageously, in representing the nodes as a series of parallel lines instead of points, the present invention provides a method of representing nodes and links in a clear, uncluttered manner. Furthermore, in applying the method of the present invention, the complexity of the representation does not increase as more nodes and links are added. Additionally, owing to the reduced complexity, the present method makes it possible for the representation to clearly communicate information about a link represented by a link line, by displaying the link line in a visually distinctive manner.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 3:
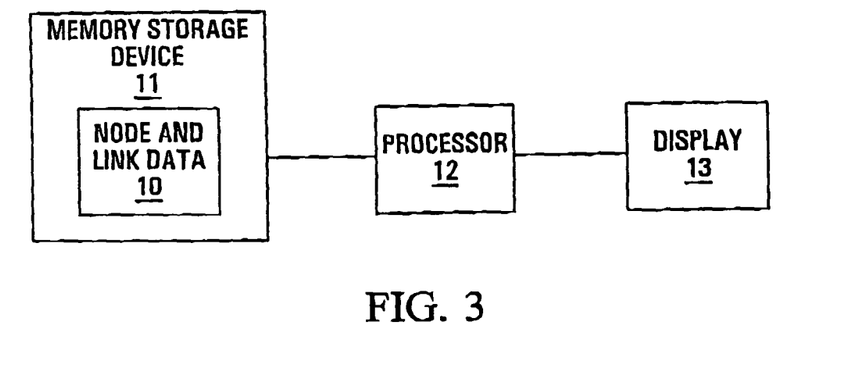
FIG. 3 is a block diagram of a computer system for implementing a method in accordance with an embodiment of the present invention.

FIG. 3 is a block diagram of a basic computer system suitable for implementing an embodiment of a method of the present invention. Node and link data 10, including such information as an identification of each node and link, as well as the nodes connected by each link, is stored in a memory storage device 11. When called upon to do so by a user, a processor 12 retrieves the node and link data 10 from the memory storage device 11, processes it as required, and displays the data on a display 13 in accordance with the present invention.

Figure 4:
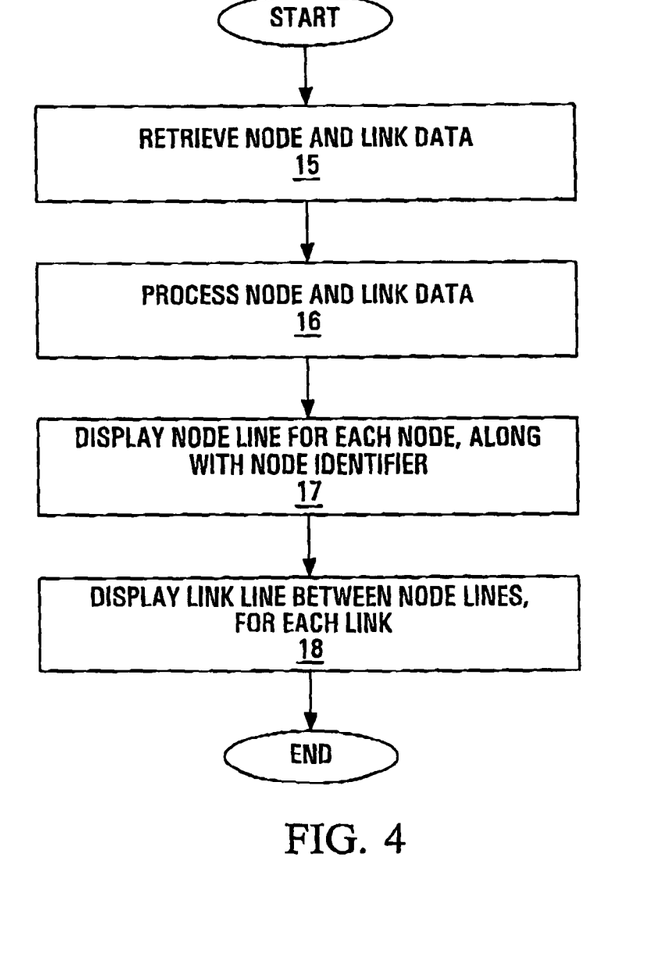
FIG. 4 is a flow chart describing a method in accordance with an embodiment of the present invention.
Figure 5:
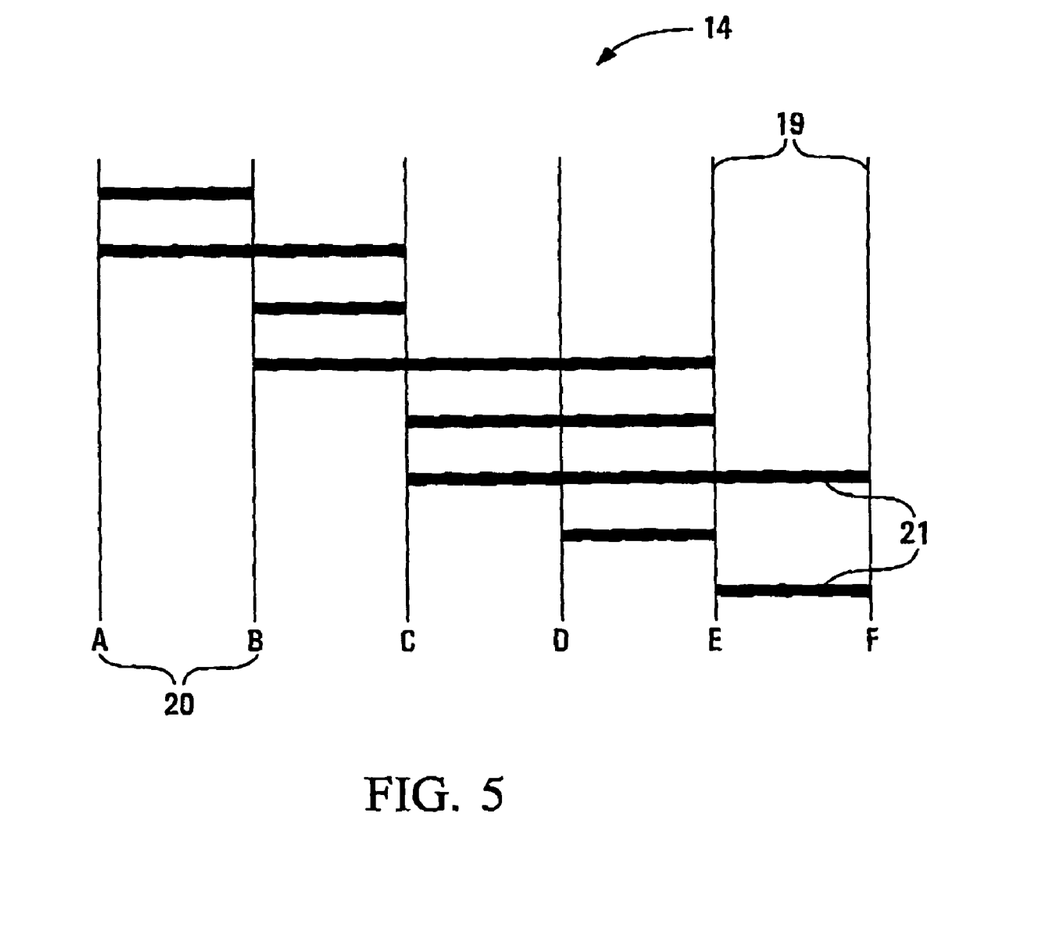
FIG. 5 is a connected graph having node lines representing nodes and link lines representing links, created using the method described in FIG. 4.

In FIG. 4, a flow chart for the implementation of an embodiment of a method of the present invention is shown. FIG. 5 shows a simple connected graph 14 created using the method described in the flow chart of FIG. 4.

In a first step 15, the processor 12 retrieves the node and link data 10 from the memory storage device 11. In a second step 16, the processor 12 processes this information as required, for example, determining the location each element is to be displayed. Further processing may also be performed at this stage as described for other embodiments below, for example sorting the link data 10 according to some sort criterion.

In a third step 17, the processor displays a number of parallel nodes lines 19 on the display 13, each of the node lines representing a node. These nodes may be identified by node indicia 20 located at the base of the node lines 19. FIG. 5 illustrates six such nodes labeled A-F.

In a fourth step 18, link lines 21 are displayed extending between, and perpendicular to the node lines 19. These link lines 21 represent links between the nodes. Each of the link lines 21 which represents a particular link, terminates at the two node lines 19 representing the nodes connected by that link.

In transportation applications, the node lines 19 may represent cities, airports or subway stations for example, with the link lines 21 representing air routes, or subway routes. In telecommunication applications, the node lines 19 may represent routers, satellites or cellular base stations for example, with the link lines 21 representing fiber-optic cables between routers or air-links between satellites and base stations.

A more sophisticated embodiment of the present invention will now be described with reference to FIG. 6.

Figure 6:
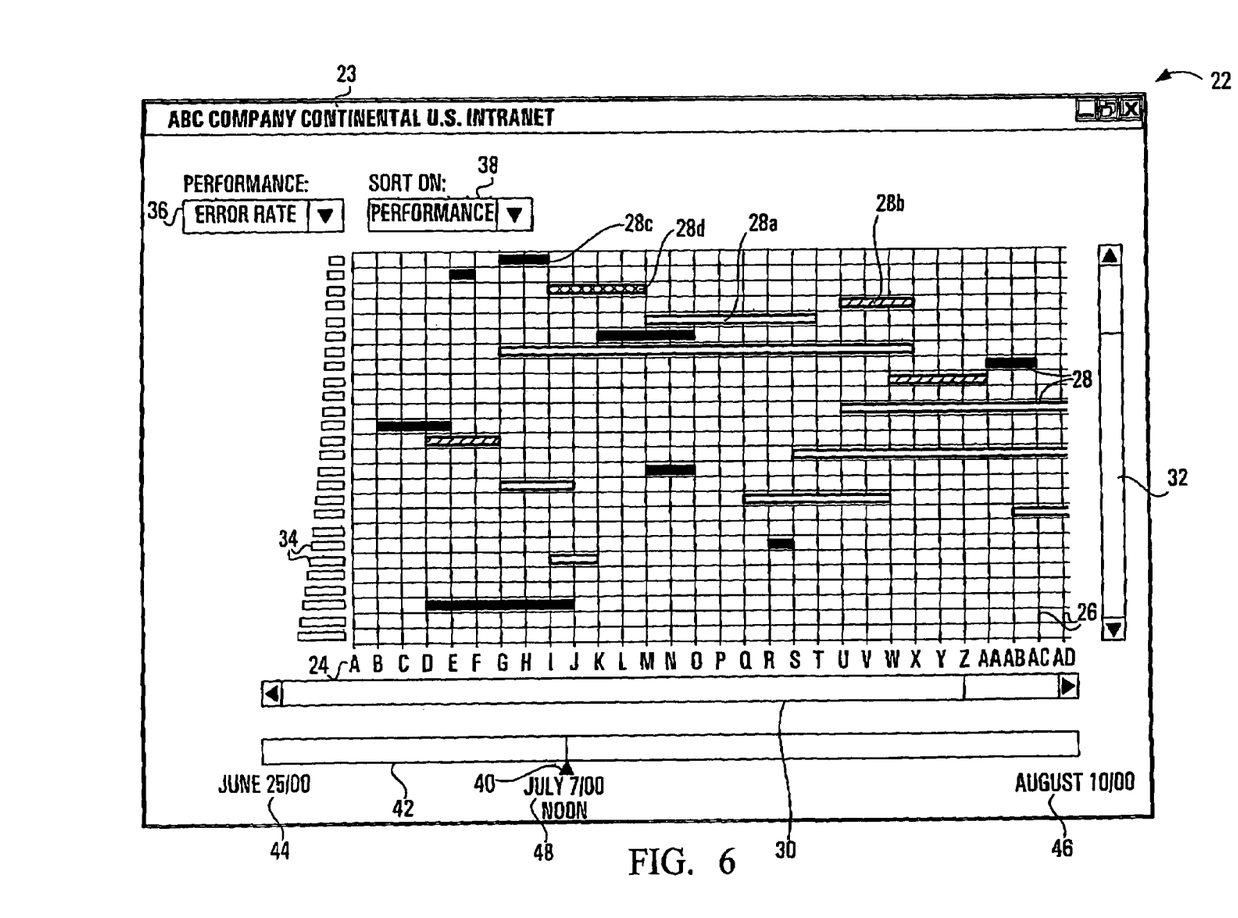
FIG. 6 is a graphical user interface implementing a method in accordance with another embodiment of the present invention.

FIG. 6 is a graphical user interface 22 created using a method in accordance with an embodiment of the present invention, which displays a connected graph in which the links between nodes in a telecommunication network are displayed. The context of such a graphical user interface, and the manner in which node and link information 10 may be collected and stored in the memory storage device 11 has recently been discussed in U.S. patent application Ser. No. 09/345,471, "Multi-panel Route Monitoring Graphical User Interface, System and Method", Rochford, et al., assigned to the assignee of the present application, and incorporated herein in its entirety. For use in creating the graphical user interface 22 displayed in FIG. 6, the node and link information 10 includes, an identification of the nodes in the network, an identification of the links in the network and the nodes each link connects, as well as link attributes and performance characteristics for each link as a function of time.

In the example displayed in FIG. 6, the name of the network for which nodes and links are displayed, is "ABC Company Continental U.S. Intranet" 23.

The nodes which are represented in this graphical user interface are identified by node indicia 24. In this example, the nodes are simply identified by alphabetical identifiers. However, they may instead be identified by other identifiers, geographical identifiers, router numbers, or distinctive icons, for example.

Projecting upward from each of these node indicia 24 are node lines 26 which represent the nodes themselves. These node lines 26 are parallel to one another.

Figure 7A:
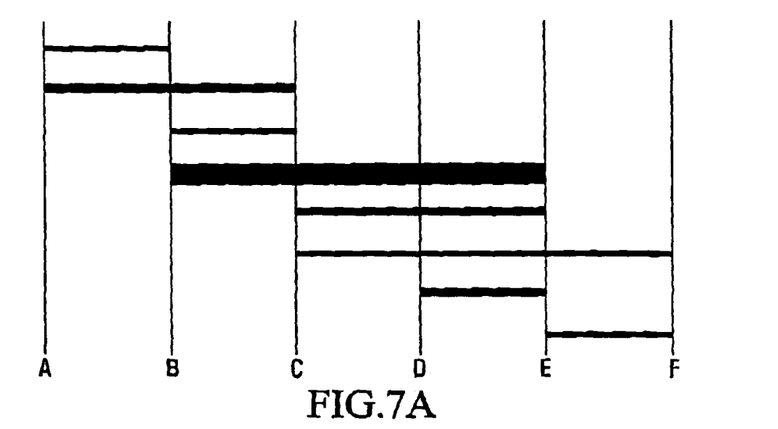
FIG. 7a is the connected graph of FIG. 5 in which a thickness of each link line is a function of a level of traffic on the link it represents.
Figure 7B:
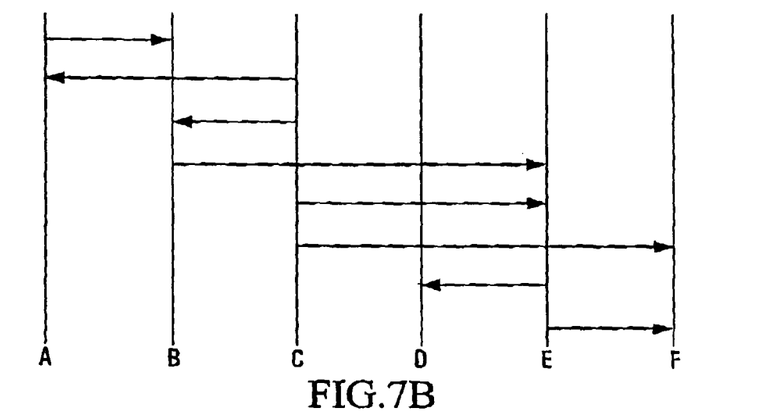
FIG. 7b is the connected graph of FIG. 5 in which a direction of data travel on each link is communicated by the placement of an arrowhead at one end of each link line.
Figure 7C:
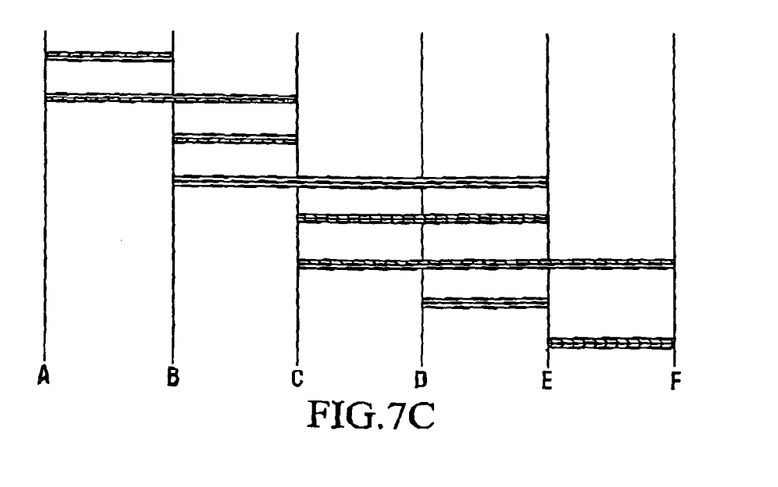
FIG. 7c is the connected graph of FIG. 5 in which two attributes of the link represented by each link line are communicated through hatching.

Extending between these node lines 26 are link lines 28 which represent the links between the nodes. Each one of the link lines 28 terminates at the two node lines 26 representing the nodes connected by the link. In this example, each of the link lines 28 is displayed using a particular shading or hatching to communicate a status of the link represented by the link line. In this case, a link line with no shading 28a indicates "ok", a link line with single hatching 28b indicates "trouble protected", a solid link line 28c indicates "trouble unprotected", while a double hatched link line 28d indicates "critical event". Of course, a legend may be provided in the graphical user interface 22. Although the shading and hatching of each one of the link lines 28 in this example communicates the status of the link it represents, the shading and hatching may be used to communicate other attributes of the link, geographic location for example. Further, although not displayed in this example, the link lines 28 may communicate attributes of the link it represents, in other ways. For example, the thickness of each of the link lines 28 may be varied to be a function of the traffic level on the link it represents, as shown in the simple example of FIG. 7a. Alternatively, in the case of unidirectional links, an arrowhead at an end of each of the link lines 28 may be used to communicate the direction of travel of data on the link it represents, as shown in the simple example of FIG. 7b. Further, each of the link lines 28 may be separated into an upper and lower half such that each half may communicate different attributes of the link it represents, as shown in the simple example of FIG. 7c. Additionally, instead of shading, different colours may be used to indicate a status of a link. Or, instead of hatching, other patterning may be used, striping or checking, for example. In each of FIGS. 7A, 7B and 7C, six nodes labeled A-F are illustrated.

In the example displayed in FIG. 6, the network contains a larger number of nodes and links than can be displayed, only a portion of which may be displayed using node lines 26 and link lines 28 at any given time. Accordingly, a horizontal scroll bar 30 and a vertical scroll bar 32 are provided such that the user may view information for nodes and links for which representations are not presently displayed.

To the left of the node lines 26 are displayed performance bars 34. Each of these performance bars 34 is associated with, and is on the same horizontal level with one of the link lines 28, and is used to communicate performance information about the link represented by the link line. This information is communicated by the length of each of the performance bars 34. A performance selector 36 is provided for selecting between various performance characteristic identifiers. The length of each of the performance bars 34 is a function of the value of the performance characteristic identified in the performance selector 36 appearing above the performance bars 34, for the link associated with the performance bar. In this case, the performance bars 34 communicate the error rate of each link, namely the average number of errors occurring on the link per unit of time. The performance characteristic communicated by the performance bars 34 may be changed using a pull-down menu (not shown) associated with the performance selector 36. Possible alternative performance characteristics may include "lost packets" (the average number of packets sent but not delivered across the link, per unit of time), "latency" (the average amount of time required to deliver data across the link), "density" (the average amount of data delivered across the link per unit of time), and "quality of service" (the level of service to be accorded to the link). Although in this example each of the performance bars 34 communicates a performance characteristic of the link represented by the link line with which it is associated, these performance bars 34 may alternatively communicate other quantitative characteristics of the link, the number of users on the link, for example.

The vertical positioning of each of the link lines 28 may be altered using a link sort-on selector 38. The link sort-on selector 38 allows the user to select the link attribute used to determine the position of each of the link lines 28, using a pull-down menu (not shown) associated with the link sort-on selector 38, said pull-down menu displaying a plurality of link attribute identifiers (not shown). In the displayed example, "performance" has been selected on the link sort-on selector 38, such that the link lines 28 are sorted in order of the performance characteristic selected in the performance selector 36, in this case "error rate". Thus, the link lines 28 appear from top to bottom from those representing links having the lowest error rate, to those representing links having the highest error rate. Other link attributes on which the link lines 28 may be ordered include "link speed", "link 30 region", "priority level of the link", "link capacity", "link status" ("ok", "troubled protected", etc.), "start node" in which those link lines representing links starting from a selected node are grouped together (placed in proximity to one another), and "lend node" in which those link lines representing links ending at a selected node are grouped together. Of course, other link attributes may be used for sorting or grouping the link lines 28.

Optionally, the link lines 28 may be vertically positioned into groups comprising link lines 28 representing links having similar link attributes. Such an option may be selected, for example by selecting the option on a pop-up menu (not shown) which is displayed when the user right-clicks on a mouse. Alternatively, the graphical user interface 22 may group the link lines by default. The link attribute used to place the link lines 28 into groups may be selected using the link sort-on selector 38.

Figure 6A:
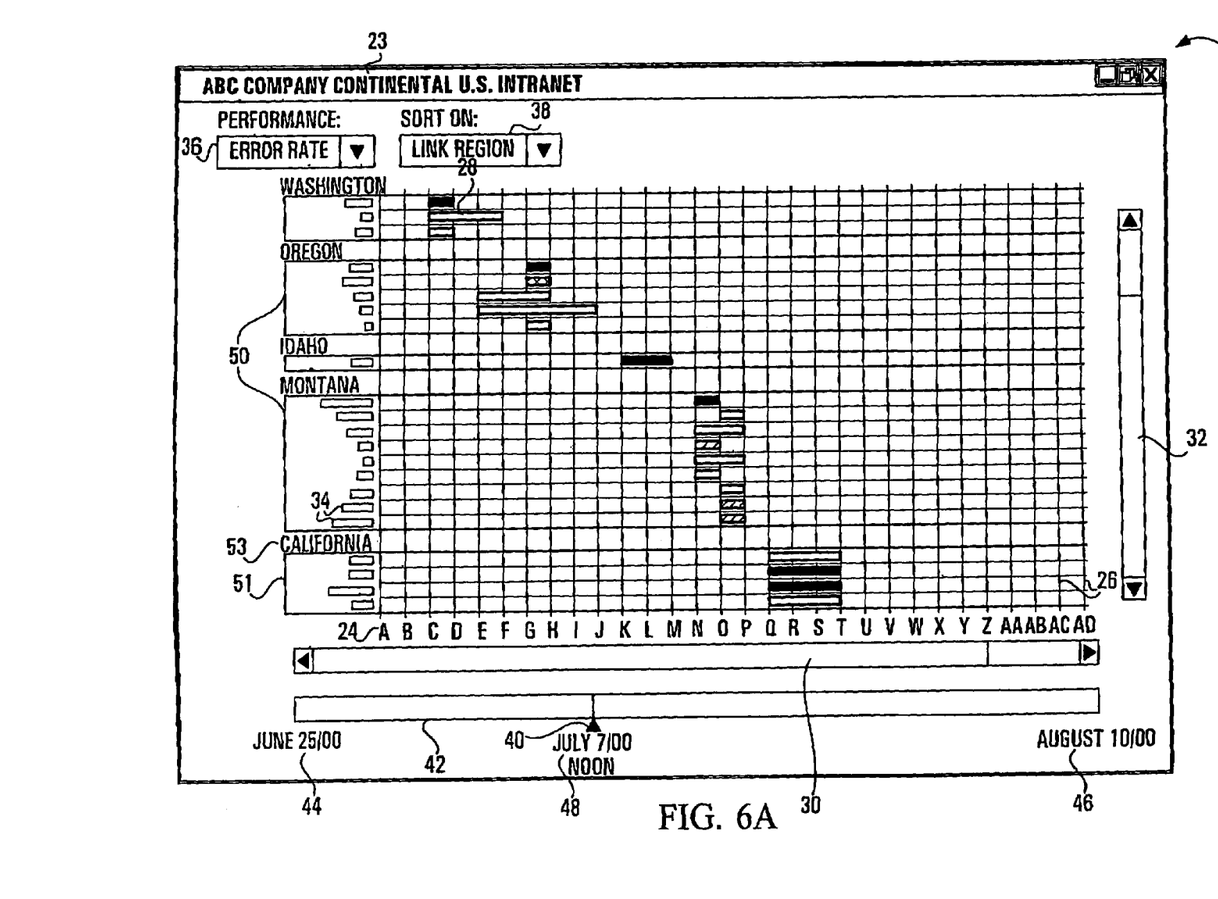
FIG. 6a is the graphical user interface of FIG. 6 in which link lines have been grouped into link groupings.

In FIG. 6a, the user has selected for the links to be displayed in groups, and "link region" has been selected in the link sort-on selector 38. Accordingly, the link lines 28 have been grouped according to the geographic region in which each of the links represented by the link lines 28 in located. In this case, the link groupings 50 have been identified by placing a box around each link grouping 50, and have also been separated from one another spatially. Of course, other means may be used to identify link groupings 50, background shading, for example. Additionally, each link grouping 50 may be identified by displaying an alphanumeric identification associated with each link grouping 50, for example "California" 53.

Alternatively, the user may select the link lines to be grouped by selecting them, for example, by clicking on the link lines with a mouse, and then selecting for the selected link lines to be grouped.

Figure 6B:
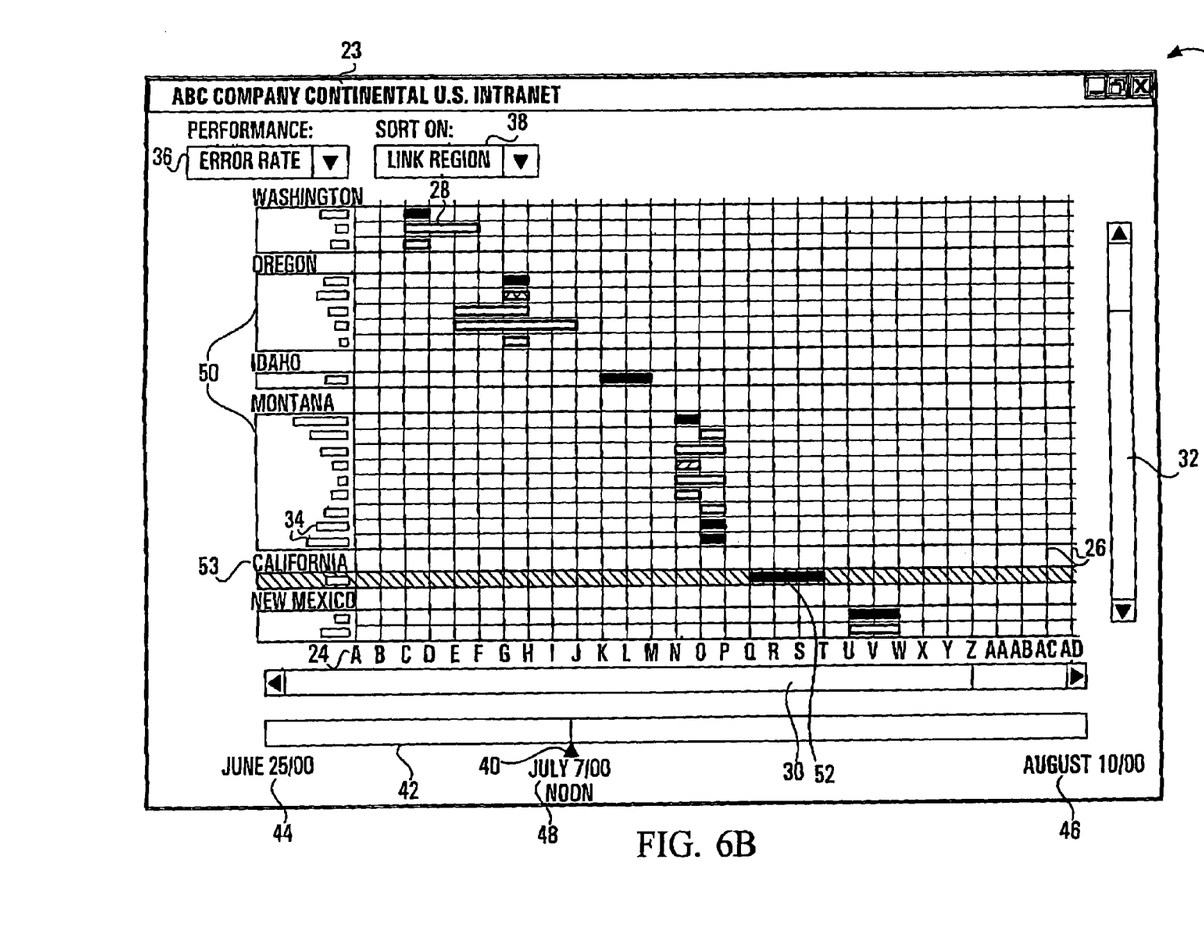
FIG. 6b is the graphical user interface of FIG. 6a in which one of the link groupings has been compressed to be represented by a compressed link line.

Optionally, a link grouping may be compressed by the user. In FIG. 6b, a particular link grouping 51 appearing in FIG. 6a has been selected, for example by the user positioning a mouse pointer (not shown) over the link grouping 51 and clicking the right mouse button, which may cause a pop-up menu to appear (not shown) allowing the user to select "compress" (this option may not be available with respect to all link groupings 50, in which case the "compress" option in the pop-up menu will appear in ghosting instead of in solid lettering). As a result, the link grouping has been compressed to a single compressed link line 52. This compressed link line 52 is visually distinguished from the others, in this case by hatching the background behind the compressed link line and its associated performance bar 34. Such link groupings So may be compressed, for example, to represent a number of optical fibers in a fiber optic cable, as a single link. When compressed, the performance characteristic value and the link attribute associated with this compressed link line 52 is the average of the performance characteristic values, or the predominant link attribute, of the links represented by the compressed link line 52. Selecting the compressed link line 52 expands the compressed link line to the link grouping 51 of FIG. 6a. Again, such selection may be effected, for example, by position a mouse pointer (not shown) over the compressed link line 52 and clicking the right mouse button, which may cause a pop-up menu to appear (not shown) allowing the user to select "expand".

Within each link grouping 50, the link lines 28 may be ordered based on the link attribute upon which the link groupings are based. For example, (not illustrated) if the link attribute upon which the link groupings 50 are based is "priority level", the link lines 28 may be grouped according to the bands of priority levels of the links they represent. Thus, one link grouping 50 may contain those link lines representing links having priority levels 1 through 10, and the next link grouping so may contain those link lines representing links having priority levels 11 through 20. In such a case, within each link grouping 50 the link lines will be ordered according to the priority level of the links they represent.

Furthermore, within each link grouping so, the link lines 28 may be vertically positioned relative to one another based on a secondary link attribute. Such secondary link attribute may be selected using another pull-down menu (not shown), for example, or may be predetermined. Thus, if for example, the link attribute upon which the link groupings 50 are based is "link status", the link lines 28 will be vertically positioned into link groupings 50 consisting of link lines 28 representing links having similar link status. Then, if the secondary link attribute upon which the vertical position of the link lines 28 is determined is "link speed", those link lines 28 comprising each link grouping 50 will be vertically ordered according to the link speeds of the links they represent.

Similarly, although not shown, the horizontal positioning of each of the node lines 26 and their associated node indicia 24 may be altered using a node sort-on selector (not shown) similar to the link sort-on selector 38. This node sort-on selector would allow the user of the graphical user interface 22 to select a node attribute used to determine the position of each of the node lines 26, using a pull-down menu associated with the node sort-on selector. Some node attributes on which the node lines 26 may be ordered include alphabetical, geographic location, technology used by the node, status of the node, and traffic load on the node. Of course, other node attributes may be used for sorting the nodes. In the illustrated example in FIG. 6, the option of the node sort-on selector is not illustrated. Instead, the node attribute upon which the horizontal position of the node lines 26 is determined has been predetermined as alphabetical, such that the node lines 26 and their associated node indicia 24 are horizontally ordered according to the alphabetical order of the names of the nodes they represent.

Optionally, the node lines 26 may be horizontally positioned into groups comprising node lines 26 representing nodes having similar node attributes. Such an option may be selected, for example by selecting the option on a pop-up menu (not shown) which is displayed when the user right-clicks on a mouse. Alternatively, the graphical user interface 22 may group the node lines by default. The node attribute used to place the node lines 26 into groups may be selected using the node sort-on selector (as discussed above).

Figure 6C:
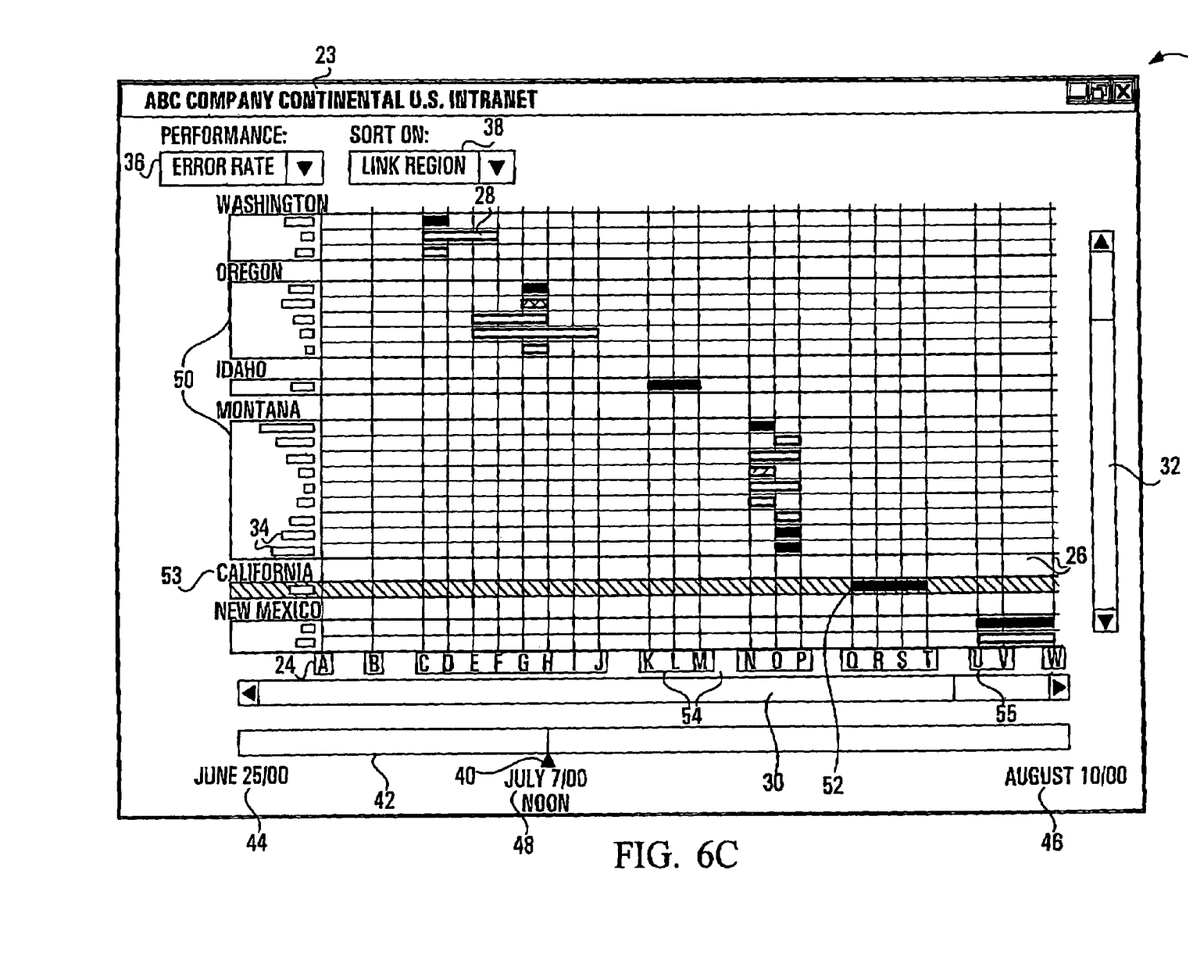
FIG. 6c is the graphical user interface of FIG. 6b in which node lines and associated node indicia have been grouped into node groupings.

In FIG. 6c, the user has selected for the nodes to be displayed in groups. The node groupings 54 have been identified by placing a box around the node indicia 24 associated with the node lines 26 of each node grouping 54, and have also been separated from one another spatially. Of course, other means may be used to identify node groupings 54, background shading, for example. Additionally, each node grouping 54 may be identified by displaying an alphanumeric identification associated with each node grouping 54 (not shown).

Figure 6D:
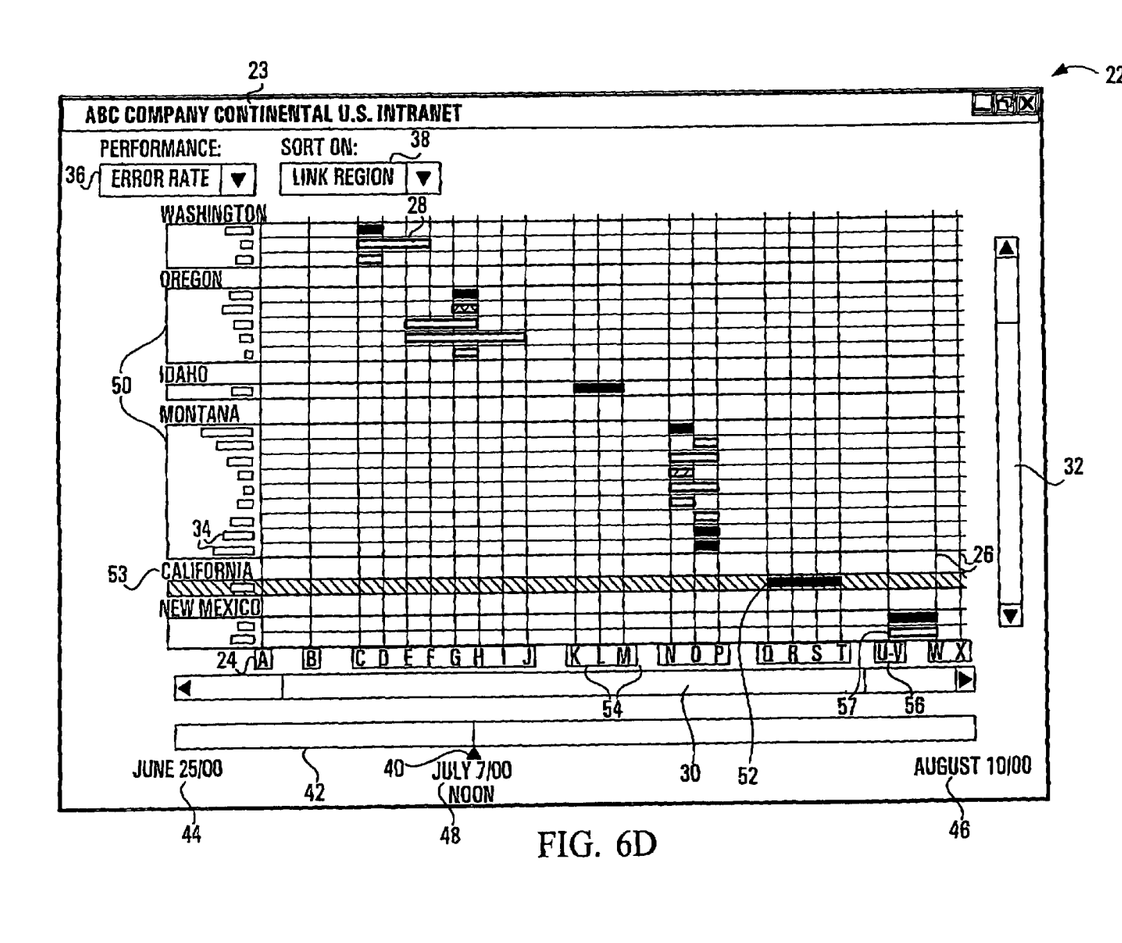
FIG. 6d is the graphical user interface of FIG. 6c in which one of the node groupings has been compressed to be represented by a compressed node line.

Optionally, a node grouping 54 may be compressed by the user. In FIG. 6d, a particular node grouping 55 appearing in FIG. 6c has been selected, for example by the user positioning a mouse pointer (not shown) over the node grouping and clicking the right mouse button, which may cause a pop-up menu (not shown) to appear allowing the user to select "compress" (this option may not be available with respect to all node groupings 54, in which case the "compress" option in the pop-up menu will appear in ghosting instead of in solid lettering). As a result, the node grouping 55 has been compressed to a single compressed node indicia 56, with a single associated node line 57. This compressed node indicia 56 is visually distinguished from the others, in this case by shading the background behind the compressed node indicia. Alternatively, the compressed node indicia 56 may be visually distinguished from the others by displaying the node indicia using a distinctive icon or a distinctive colour (not shown). Such node groupings 54 may be compressed, for example to represent a number of nodes at a single geographic location, as a single node. Selecting the compressed node indicia 56 expands the compressed node indicia to the node grouping 55 of FIG. 6c. This may be effected, for example, by the user positioning a mouse pointer (not shown) over the compressed node indicia 56 and clicking the right mouse button, which may cause a pop-up menu (not shown) to appear allowing the user to select "expand".

Within each node grouping 54, the node lines 26 may be ordered based on the node attribute upon which the node groupings 54 are based. For example, (not illustrated) if the node attribute upon which the node groupings are based is first letter of the name of the node, the node lines 26 are grouped according to the first letter of the name of the nodes they represent. Thus, one node grouping 54 may contain those node lines 26 and associated node indicia 24 representing nodes having names beginning with the letter "A", and the next node grouping 54 may contain those node lines 26 and associated node indicia 24 representing nodes having names beginning with the letter "B". In such a case, within each node grouping 54 the node lines will be ordered according to the alphabetical order of the names of the nodes they represent.

Furthermore, within each node grouping 54, the node lines 26 may be horizontally positioned based on a secondary node attribute. Such secondary node attribute may be selected using another pull-down menu (not shown), for example, or may be predetermined,. Thus, if for example, the node attribute upon which the node groupings 54 are based is node technology, the node lines 26 will be horizontally positioned into node groupings 54 consisting of node lines 26 representing nodes having similar node technology. Then, if the secondary node attribute upon which the horizontal position of the node lines 26 is determined is traffic load, those node lines 26 comprising each node grouping 54 will be horizontally ordered according to the traffic load of the nodes they represent.

The date/time for which all of the information is displayed in the graphical user interface 22 is selected by moving a slide tab 40 along a time bar 42. In this case, the time bar represents the period from Jun. 25, 2000 44 to Aug. 10, 2000 46, and the date/time selected for displaying information is Jul. 7, 2000 at noon 48. Moving the slide tab 40 to a different location on the time bar 42 automatically updates the information displayed in the graphical user interface 22 to that as of the time/date corresponding with the location of the slide tab 40.

Alternatively, the graphical user interface 22 may display data in real time such that the information displayed is updated continuously.

In the case of links which are temporal in nature, the links to be represented may be determined by the period represented on the time bar 42. For example, the graphical user interface 22 may represent only these links over which data actually travelled during the time period indicated on the time bar.

Figure 8:
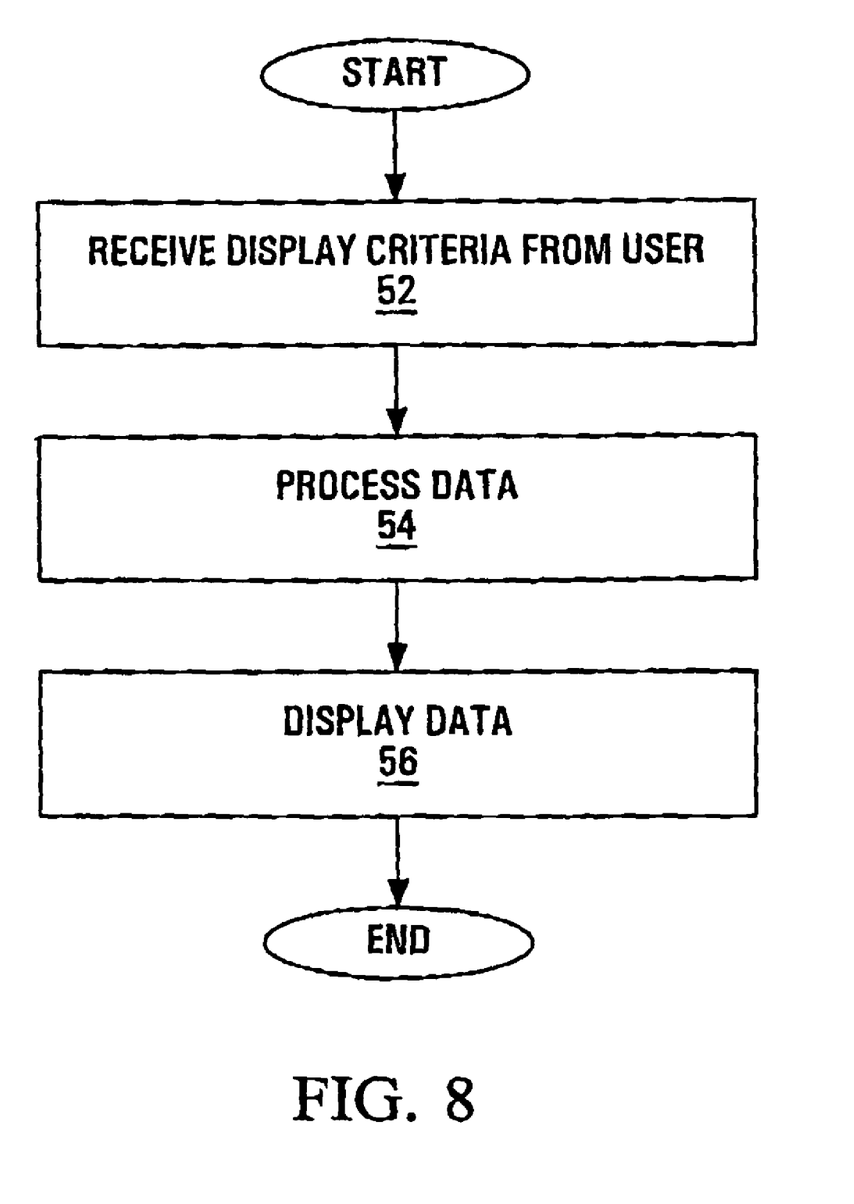
FIG. 8 is a flow chart describing how the graphical user interface of FIG. 6 changes upon selection of a different display criteria by a user.

FIG. 8 is a flow chart describing the basic functionality of the graphical user interface 22 when display criteria are changed by the user. Upon receipt 50 of display criteria from the user, for example, the time for which data is to be displayed, the link attribute upon which the links are to be sorted or grouped, and the performance characteristic to be displayed by the performance bars 34, the node and link data 10 is processed 54 to determine, for example, the order of the link lines 28 to be displayed, the shading or hatching to be used for each link line, and the length of the performance bar 34 to be displayed in association with each link line. The data is then displayed 56.

Although a detailed description of the appearance and functionality of a preferred embodiment graphical user interface according to the present invention has been provided, it will be understood by a person skilled in the art that variations may be made to both the appearance and the functionality without departing from the scope of the present invention.

Further, although the present invention has been discussed as being applicable in the transportation and telecommunication industries, it is to be understood that the connected graph and graphical user interface of the present invention may be utilized to display nodes and links in other applications, the electronics field for example, to display connections between electronic components, in distribution network applications, such as oil, gas or water distribution systems, to display piping connections between pumping stations, or in software development applications to display connections between class objects for an object-oriented computer program.

Additionally, although the method and connected graph of the present invention has been described as being dynamically represented on a computer system, it is to be understood that it may also be statically represented on a computer, or on printed media, on a poster, an overhead transparency or in a report, book or pamphlet, for example.

Numerous modifications and variations of the present invention are possible in light of the above teachings. It is therefore to be understood that within the scope of the appended claims, the invention may be practiced otherwise than as specifically described herein.

The invention claimed is:

1. A method performed at a computer system for displaying representations of nodes, and links connecting said nodes, of a network, said method comprising:
   displaying, at the computer system, a node line representing each one of said nodes, each node line being parallel to every other node line, wherein each node has associated node attributes;
   displaying, at the computer system, a link line representing each one of said links, each link line being perpendicular to each node line, wherein each link line terminates at two node lines, said two node lines representing the nodes connected by the link represented by the link line, wherein each link has associated link attributes;
   grouping either a selected plurality of the node lines having similar node attributes into a selected node line group or a selected plurality of the link lines having similar link attributes into a selected link line group;
   compressing the selected node line group or the selected link line group as a single compressed node line or a single compressed link line, respectively; and
   displaying, at the computer system, the single compressed node line or the single compressed link line as a visually distinguishable representation of the selected node line group or the selected link line group.

2. The method of claim 1 wherein each link line is displayed, at the computer system, with a link line characteristic which visually communicates at least one of the associated link attributes of the link that the link line represents.

3. The method of claim 2 wherein the link attribute is communicated by displaying, at the computer system, the link line in a distinctive colour.

4. The method of claim 2 wherein the link attribute of the link is communicated by displaying, at the computer system, the link line as a patterned line.

5. The method of claim 2 wherein the link line characteristic comprises a line thickness which is representative of the link attribute.

6. The method of claim 1 wherein each link line is displayed, at the computer system, in a manner which visually communicates a plurality of link attributes of the link it represents.

7. The method of claim 1, wherein the single compressed node line represents a number of nodes at a single geographic location.

8. The method of claim 1, wherein the single compressed link line includes an associated performance value.

9. The method of claim 8, wherein the associated performance value of the single compressed link line is an average of performance values associated with the selected plurality of link lines of the selected link line group.

10. The method of claim 8, wherein the associated performance value of the single compressed link line is a performance value associated with a predominant link line of the selected plurality of link lines of the selected link line group.

11. The method of claim 1, wherein the single compressed link line represents a number of optical fibers in a fiber optic cable.

12. A non-transitory computer readable medium having tangibly stored thereon instructions for instructing a computer to execute a method to generate a graphical user interface for displaying a visual representation of nodes, and links connecting said nodes, of a network, said method comprising:
   displaying a node line representing each one of said nodes, each node line being parallel to every other node line, wherein each node has associated node attributes;
   displaying a link line representing each one of said links, each link line being perpendicular to each node line, wherein each link line terminates at two node lines, said two node lines representing the nodes connected by the link represented by the link line wherein each link has associated link attributes;
   grouping either a selected plurality of the node lines having similar node attributes into a selected node line group or a selected plurality of the link lines having similar link attributes into a selected link line group;
   compressing the selected node line group or the selected link line group as a single compressed node line or a single compressed link line, respectively; and
   displaying, the single compressed node line or the single compressed link line as a visually distinguishable representation of the selected node line group or the selected link line group.

* * * * *